March 30, 1954     W. C. GOSS     2,673,370
METHOD OF MANUFACTURING SHEET LUMBER
Filed Aug. 17, 1951
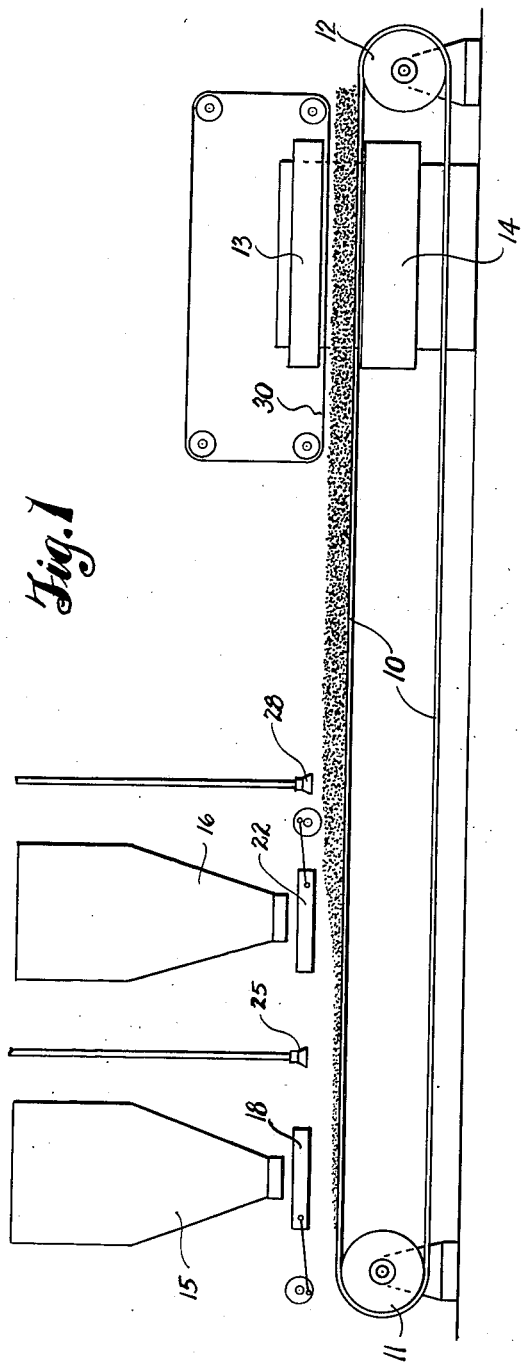
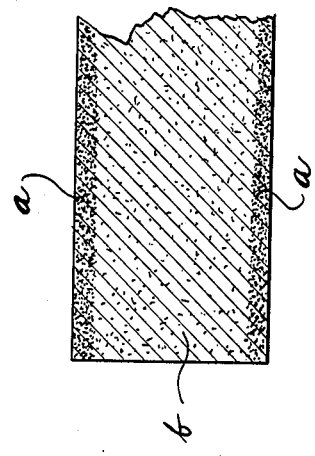
INVENTOR.
WORTH C. GOSS
BY
Cook + Robinson
ATTORNEYS

Patented Mar. 30, 1954

2,673,370

UNITED STATES PATENT OFFICE 2,673,370

METHOD OF MANUFACTURING SHEET LUMBER

Worth C. Goss, Houghton, Wash., assignor to The Sheetwood Products Company, Seattle, Wash., a corporation of Washington Application August 17, 1951, Serial No. 242,196

13 Claims. (Cl. 18—47.5)

This invention relates to the manufacture of what is known in industry as sheet lumber. More particularly, the invention has reference to improvements in the methods of manufacturing that kind of sheet lumber coming within the general classification of the products described in my United States Patent No. 2,485,587 and my pending application, Ser. No. 98,759, filed June 13, 1949, now abandoned, wherein, I have described the making of sheet lumber from a mixture of fiberized ligno-cellulosic material and a hydro-plastic bonding agent, by felting the mixture of materials into a loosely matted pad and then compressing or consolidating the pad under heat and pressure between the platens of a press.

The present application and disclosure herein is a continuation in part of my allowed application Serial No. 688,590, filed August 6, 1946, now abandoned.

In the patent above mentioned, I have described the manner of treating wood pieces with steam or hot water and then reducing them, while hot and wet, to a fiberized condition and have disclosed in that patent the character of the hydro-plastic bonding agent and the manner of mixing it with the wet fibrated material preparatory to consolidation of the mixture to form the sheet. The specification of that patent emphasizes that the consolidating heat and pressure shall be maintained until the sheet is perfectly dry in order to prevent its being disrupted under internal pressure of steam when the press is opened.

In the pending application above mentioned, I have described the method of making sheet lumber of the same character as that of the previously mentioned patent, from a mixture containing a wet, fibrated material and a hydroplastic bonding agent that is consolidated under heat and pressure, and which lumber can be removed from between the press platens while still wet and hot by reason of the use of a bonding agent having the property of being able to set while wet and hot. That is, the agent therein used is of a special kind that has sufficient adhesive strength, while wet and hot, to bond the fibers of the pressed sheet together with sufficient adhesiveness as to resist any explosive tendency that may exist in the sheet after a relatively short interval of pressing, thus permitting the sheet to be removed from the press before it is dry, thus cutting down the time otherwise and previously required in the press and incidentally reducing manufacturing costs accordingly.

In another United States Patent No. 2,542,025 I have described a method of making sheet lumber from a mixture of materials like that of the patent first discussed, in a press wherein one platen is vented for the escapement of steam from the sheet during the pressing interval, and wherein the particular platen is heated to a degree sufficiently higher than that of the platen at the opposite side that the opposite surface portions of the sheet will be formed with hard welded surface layers of equal thickness at opposite sides of a portion of lesser density.

It is most desirable, for many reasons, that lumber of the kinds herein referred to as sheet lumber shall have a hard, glossy surface at least on one side of the sheet, and I have found that in order to produce such a surface, it is necessary that the platen against which that surface is formed must be smooth and heated to high degree, and that the material that forms the surface portion must be wet when subjected to the consolidating heat and pressure; that is, the mixture of materials that is to form the surface layer must have a substantial percentage of water therein when pressing starts. However, it is by reason of this requirement that the material shall contain a substantial percentage of moisture that the pressing period has heretofore been rather long and manufacturing costs are high.

The pressing time for the manufacture of sheet lumber, which was reduced by the method of my application Ser. No. 98,759, filed June 13, 1949, from about eighty to eight minutes, could be reduced further if the percentage of moisture content of the material used could be reduced, but prior to the method herein disclosed, I have considered it undesirable to reduce the moisture content further because experiments along this line had resulted in bringing about undesirable surface conditions in the sheet. In experimenting, I had attempted to overcome the disadvantages residing in excessive or high moisture content of material and the incident requirement of a long pressing period, by reducing the degree of wetness of the whole bulk or body of material used, but found that if less than approximately 70% of moisture existed therein, the surface portions of the sheet, under the required coalescing temperatures, would be scaley and otherwise unsatisfactory.

In view of the previously mentioned necessity of a relatively high percentage of moisture in the fibrated material to produce a hard, smooth, glossy surface condition, and further, in view of the high manufacturing costs that result from previous methods, when that necessary percentage of moisture is used, it has been the principal object of this invention to provide a new method for the manufacturing of sheet lumber having the much desired hard, smooth and glossy surface, and at the same time making possible a further reduction of the pressing period without impairing the utility of the product.

It is also an object of this invention to provide a novel method of manufacturing sheet lumber having the desired hard and glossy surface, and which may be removed with safety from the press while still wet and hot, and after a shorter period of pressing time than by previous methods, and which process also is commercially feasible, desirable and is applicable to the manufacture of lumber in continuous sheets.

Still further objects of the invention reside in the novel steps of the method and in their sequence, as will hereinafter be fully explained.

The present invention contemplates the use of a mixture, comprising fiberized material and a hydro-plastic bonding agent for the formation of the surface portions of the sheet, that contains a relatively high percentage of moisture, and use of a similar mixture for forming the body portion of the sheet, but which mixture contains a relatively low percentage of moisture. For example, where I formerly employed a mixture of material which contained approximately ninety percent of moisture and which was used without alteration, for forming the surface portions as well as the body portion of the sheet, the present method calls for the use of a material having what might otherwise be considered an excess of moisture for the surface portions, and material having what might otherwise be considered insufficient moisture, for the body portion. The body portion constitutes about 90% of the mass of material as prepared for a sheet, and with its low moisture content, the sheet can be quickly pressed to a condition suitable for safe removal from the press.

From my research and experiments I have found that the moisture content of the body portion may also be varied depending upon the particular type of hydro-plastic bonding agent which is used. I have found that when a meltable resin is employed the moisture content in the body portion may be as low as 5% and still produce satisfactory results. A meltable resin as referred to herein identifies a hydro-plastic bonding agent which has the property of melting under the action of heat only. An example of such is a soft, phenol formaldehyde which has a melting point of approximately 90° C. For reasons of cost or to overcome problems of manufacturing, it may be desired to use resin bonding agents which have a melting point of approximately 300° F. When such resins are used the moisture content of the body portion may be raised to approximately 35%. In such case, however, the pressing and drying time is substantially increased.

It is to be understood that I have discovered that either the meltable resin or a resin which melts at a temperature of approximately 300° F. are satisfactory bonding agents for use in forming sheet lumber boards. The particular type of bonding agent used in carrying out the teaching of my invention will be determined by the manufacturing equipment employed, the thickness and density of the board to be produced.

The present method might be carried out in various ways. As an example of one way, I first prepare separate supplies of material for body and surface portions of the sheets. The material used for body portion preferably would contain approximately 10% moisture, if a meltable resin is used, but this might be anywhere within the range of 5% to 70% depending upon the resin bonding agent and method of pressing employed. If a resin with a higher melting point is used, it is preferred that the body portion contain approximately 45% moisture content. The material for the surface portions preferably would contain approximately 100% of moisture, but this might be anywhere within a range of from 70% to 150%. A pad of the materials is formed for pressing by first spreading a thin bottom layer of the relatively wet surface material on a smooth platen surface, then placing the relatively dry body material thereon to a desired thickness, and then placing the top surface layer of wet material upon the body. The pad is then pressed under platen pressures and temperatures as in my previous methods to reduce the pad to a solid sheet.

In using this simple method, I find that to produce a sheet of hard, water-resistant lumber, having a thickness of one-half inch when completed, I first sift onto a plate or platen, the fibrous mixture to form a layer of about one-half inch thickness; the material for this portion having a moisture content of about 100% to form the bottom surface layer. Then I sift upon this about nine inches of the body material of the desired moisture content, and finally I sift onto this body material another half inch of the wet surface material having a moisture content of about 100%. This pad of material is then pressed under the conditions of temperature and pressure set out in my Patent No. 2,542,025 to form this sheet. This particular method of pressing takes into consideration the stem venting through the upper platen and use of higher temperature on the steam vented platen in order to insure hard surface layers of the same thickness.

Another way might be to prepare a supply of material of low moisture content. Then to sift a thin layer for the bottom surface portion onto a smooth platen surface, and add moisture to this by use of a fine spray to bring it up to the desired wet condition. Then upon this wetted layer to sift on more of the material of low moisture content to form the body layer and top surface. Then, by use of a spray, to add moisture to the top surface portion to bring it to the condition of the lower surface layer, and then to press the matted blanket of material to solidity as in my previously described methods.

It is anticipated that this latter method may be carried on by sifting the material onto a traveling belt arranged to carry the pad between the platens of a press. In that case the belt will form the smooth bottom surface on which the smooth glossy surface of the sheet will be formed by the pressing operation. Also, it is contemplated that the upper platen of the press will be formed by the pressing operation. Also, it is contemplated that the upper platen of the press will be vented for the escapement of steam from the pad during the pressing operation, and that a screen of suitable mesh will be used between this platen and the pad of material.

The use of material having the stated proportions results in the formation of hard, dense surface layers and a less dense body portion.

To carry out the invention in accordance with the method last described, I have provided mechanism disclosed in the accompanying drawing, wherein—

Fig. 1 is a diagrammatic view of an apparatus for forming the present sheet.

Fig. 2 is an enlarged sectional view of a portion of a sheet showing the surface and body portion of different densities.

Referring more in detail to the drawings—

10 designates a continuous metal belt having a horizontal run thereof operating between supporting rolls 11 and 12 and between the heated platens 13 and 14 of a press and across the lower platen. Located in advance of the press, are hoppers 15 and 16 which contain supplies of the prepared mixture of fibrated material for the sheet. The mixture of the first hopper may be discharged onto a shaker screen 18 and sifted onto the traveling belt to form a layer of predetermined thickness and carried thereby toward the press. The mixture in the second hopper may likewise be discharged under control onto a shaker 22 and sifted therefrom onto the belt to complete the felted pad for making the sheet.

Between the hoppers 15 and 16 is a spray 25 whereby a predetermined amount of moisture may be applied to the bottom surface layer, and between the hopper 16 and the press, is a spray head 28 whereby a predetermined amount of moisture may be added to the top portion of the pad.

A screen belt 30 is arranged to overlie the pad of material in the press for the venting of steam therethrough.

In lieu of the adding of moisture as shown, three hoppers could be used, and arranged in succession along and above the belt, the center one of which would contain material of low moisture content and the others material of high moisture content for the surface layers. From these, the material would be sifted onto the traveling belt, each to form a layer of a definite thickness and the pad thus formed would be conveyed between the platens of the press for consolidation.

Sheets of material one-half inch thick, formed in accordance with the teachings herein, can be removed from the press in about four minutes, and after a final baking treatment, will be found to be exceptionally good for their intended uses.

In Fig. 2 of the drawing, a portion of one of the pressed sheets of lumber, is shown in cross section. This has top and bottom surface portions, designated by reference character $a$ which under the present method of manufacture will be hard, dense and strong, while the body, designated by reference character $b$, will be strong and of lesser density, thus giving the sheet many advantages in use.

In the making of sheet lumber in accordance with any of the foregoing methods it is anticipated that if it should be desired to produce a sheet with only one of its surfaces formed of the hard, welded material, then the fiberized material of high percentage of moisture would be used only on that side of the sheet that is engaged by the smooth platen. For example, in the practising of the method by use of the machine of Fig. 1 of the drawing, the wetting of the bottom surface layer by the spray head 25 would be continued, but the wetting of the top surface by spray head 28 would be discontinued.

Since the present invention deals more particularly to a method of manufacture that reduces pressing time and at the same time produces a sheet having the desired surface characteristics and the required strength for its intended uses, and which method is based primarily upon the use of fiberized materials of like kind but of different moisture content for surface and body portions of the sheet, it is not desired that the claims which define the scope of the invention should be restricted unnecessarily by inclusion of pressing temperatures and consolidating pressures, nor to any specific mixture.

Therefore, it is to be understood that in the use of the terms "consolidated," "coalesced" or "welded" it will be anticipated that temperatures and pressures shall be used that bring about this result.

Furthermore, a fibrous ligno-celleulose material may be considered one with or without an added binding agent if it is of a kind that can be welded or coalesced under the conditions specified.

Having thus described my invention, what I claim as new therein and desire to secure by Letters Patent is:

1. The method of making an integral non-expandable fiber sheet with a hard, dense surface portion and less dense body portion comprising forming a pad from uniformly damp ligno-cellulosic fibers with moisture content within a range of 5% to 70%, applying additional moisture to the surface of the pad to provide a surface layer with moisture content substantially greater than that of the body portion, but not above 150%, then compressing the pad between press platens heated to such degree as to effect the generation of steam from moisture in the pad and the compacting and welding together of the fibers throughout the compressed sheet.

2. The method of making an integral fiber sheet with a hard, dense surface portion comprising laying down a surface-forming portion of a pad from uniformly damp ligno-cellulosic fibers with moisture content of not less than 70%, forming thereon the body portion of the pad from uniformly damp ligno-cellulosic fibers with moisture content substantially less than the surface-forming portion and within a range of 5% to 70%, then compressing the pad into unity between press platens with a coincident application of heat to the pad through the platens to effect the generation of steam from moisture therein and the coalescing of fibers throughout the compressed sheet under the action of heat and pressure.

3. The method of making an integral fiber sheet with hard glossy surface, comprising forming a thin layer of fiberized ligno-cellulosic material of between 70 to 150 per cent moisture content on a smooth surfaced platen, superimposing thereon a layer of the fiberized ligno-cellulosic material, of from 5 to 70 per cent moisture content to form the body of the sheet, then consolidating the layers into an integral sheet by pressure between press platens with a coincident application of heat.

4. The method of making an integral fiber sheet with hard glossy surface, comprising forming a thin layer of fiberized ligno-cellulosic material of between 70 and 150 per cent moisture content on a smooth surfaced platen, superimposing thereon a layer of the fiberized ligno-cellulosic material, of from 5 to 70 per cent moisture content to form the body of the sheet, then placing a top surface layer of the fiberized ligno-cellulose on the body forming layer corresponding to the bottom surface layer, then consolidating the layers into an integral sheet by pressure between the press platens with a coincident application of heat and retaining the sheet under heat and pressure until its moisture content has been reduced below 40%.

5. The method of making an integral fiber sheet with hard, dense surface portions comprising forming one surface layer of uniformly damp ligno-cellulosic fibers having a moisture content within a range of 70% to 150%, forming directly thereon a body of uniformly damp ligno-cellulosic fibers having a moisture content substantially less than the moisture content of the surface layer and within a range of 5% to 70%, forming directly on the body the other surface layer of uniformly damp ligno-cellulosic fibers having a moisture content within a range of 70% to 150%, then compressing the pad to unity between press platens heated to a degree to generate steam from moisture in the fibrous material; said pressure and heat being maintained until the fibers have been coalesced throughout the compressed sheet.

6. The method of making an integral fiber sheet with hard glossy surfaces comprising preparing a matted layer of fiberized ligno-cellulosic material wherein the main body of material has a moisture content of from 5 to 70 per cent moisture content and the surface portions have a moisture content of from 70 to 150 per cent, consolidating the layer into a solid, integral sheet between a smooth surfaced press platen and a press platen having a steam vented surface, with a coincident application of heat applied through the platens to reduce the moisture content of the sheet to below 40 per cent and weld the fibers together in a permanent relationship.

7. The method of making an integral fiber sheet with dense surface portion comprising preparing a uniform mixture of ligno-cellulosic fibers and a plastic bonding agent having a moisture content of from 5% to 70%, forming a pad of said mixture, adding moisture to the surface portions only of the pad to substantially increase the moisture content of these portions within a range of from 70% to 150%, then compressing the pad into an integral sheet between the platens of a press heated to a degree that will generate steam in the pad and facilitate the setting of the agent and permanent welding of the fibers in the compressed sheet under the action of heat and pressure.

8. The method of making an integral fiber sheet with hard glossy surface comprising preparing a mixture composed of uniformly damp fiberized ligno-cellulosic material and a hydro-plastic bonding agent, said mixture having a moisture content of approximately 45%, sifting a surface layer of the mixture onto a smooth platen, adding moisture thereto to raise it to approximately 100% moisture content, applying a layer of the mixture on said surface layer to form the body of the sheet, and its top surface portion, adding moisture to the top surface portion to increase its moisture content to approximately 100%, then consolidating the layers between heated press platens to form the layers into an integral sheet of about 40% moisture content.

9. The method of making an integral fiber sheet with hard glossy surface comprising preparing a mixture composed of uniformly damp fiberized ligno-cellulosic material and a hydro-plastic bonding agent; said mixture having a moisture content of approximately 45%, sifting a surface layer of the mixture onto a smooth platen, adding moisture thereto to raise it to approximately 100% moisture content, applying a layer of the mixture on said surface layer to form the body of the sheet, and its top surface portion, adding the moisture to the top surface portion to increase its moisture content to approximately 100%, then consolidating the layers between heated press platens to form the layers into an integral sheet of about 40% moisture content, then removing the sheet and completing the drying without pressure.

10. The method of making an integral fiber sheet, comprising forming a pad from ligno-cellulosic fibers by causing fibers from different sources of supply to fall from suspension in air to form the bottom surface portion, the body portion and the top surface portion of the pad; the fibers which form the body portion of the pad being uniformly damp and having a moisture content within a range of 5% to 70% and those that form the surface portions being uniformly damp and having a moisture content substantially higher than the body portion but within a range of 70% to 150%, then compressing the pad in a hot platen press under a heat sufficient to effect the generation of steam from moisture in the pad and the coalescing of fibers under the action of heat and pressure.

11. The method of making an integral fiber sheet with surface portions of high density comprising fiberizing a ligno-cellulosic material, coating the fibers with a bonding agent, laying down a surface-forming layer of said fibers of uniform moisture content within a range of 70% to 150%, laying down directly thereon a body portion of said coated fibers having a moisture content within a range of 5% to 70%, then laying down on the body portion, the other surface portion of coated fibers of uniform moisture content within a range of 70% to 150%, then compressing the pad between heated platens of a press with a coincident application of steam generating heat to form a non-expandable sheet of about 40% moisture content, then removing the sheet from the press and drying it.

12. The method of making an integral fiber sheet with a hard glossy surface comprising fiberizing a ligno-cellulosic material and coating the fibers with a hydro-plastic bonding agent, sifting a surface forming layer of the fibers having a moisture content of from 70% to 150% onto a smooth platen, then sifting thereonto a body layer of the fibers having a moisture content of from 40% to 60% moisture content, and consolidating the layers between the heated platens of a press to form the layers into an integral sheet of about 40% moisture content.

13. The method of making an integral fiber sheet with hard glossy surfaces comprising fiberizing a ligno-cellulosic material and coating the fibers with a hydro-plastic bonding agent, sifting a relatively thin surface forming layer of the fibers having a moisture content of from 70% to 150% onto a smooth platen, sifting thereonto a body layer of the fibers, having a moisture content of from 40% to 60%, then sifting another surface layer of the fibers having a moisture content of from 70% to 150% onto the body layer then consolidating the several layers between heated platens of a press to form them into an integral, non-expandable sheet of below 40% moisture content.

WORTH C. GOSS.

References Cited in the file of this patent

UNITED STATES PATENTS

| Number | Name | Date |
|---|---|---|
| 1,438,966 | Perry | Dec. 19, 1922 |
| 2,033,411 | Carson | Mar. 10, 1936 |
| 2,215,244 | Linzell | Sept. 17, 1940 |
| 2,293,914 | Nanfeldt | Aug. 25, 1942 |
| 2,369,488 | Perry | Feb. 13, 1945 |